Dec. 18, 1934.  J. A. SERRELL  1,984,437

THERMALLY RESPONSIVE SYSTEM

Filed Dec. 22, 1930   6 Sheets-Sheet 1

Inventor.
John A. Serrell.
By ...
Attys.

Dec. 18, 1934.   J. A. SERRELL   1,984,437
THERMALLY RESPONSIVE SYSTEM
Filed Dec. 22, 1930   6 Sheets-Sheet 2

Dec. 18, 1934.  J. A. SERRELL  1,984,437
THERMALLY RESPONSIVE SYSTEM
Filed Dec. 22, 1930  6 Sheets-Sheet 3

Inventor:
John A. Serrell.

Fig. 9.

Patented Dec. 18, 1934

1,984,437

UNITED STATES PATENT OFFICE 1,984,437

THERMALLY RESPONSIVE SYSTEM

John A. Serrell, Pass-A-Grille, Fla., assignor to Warren Webster & Company, Camden, N. J., a corporation of New Jersey Application December 22, 1930, Serial No. 503,993

10 Claims. (Cl. 236—91)

My invention relates to a novel method and to apparatus for thermal control, incorporated in but not limited to a steam heating system, including also a novel method of heating, that is to say, a novel thermally responsive system.

It will be well to recall certain principles before entering a discussion of my invention, and in doing so, I shall refer to steam heating in general and in particular before attempting to present the possibilities of my invention with reference to other arts.

The general object of a heating system is to maintain a desired temperature condition within a building to which it is applied. The maintenance of such desired temperature is dependent on numerous factors, such as the location of the building and the location of a room within the building, heat loss through doors, windows, through the building structure and through equipment, and finally on the variable factor of outside temperature changes.

The last factor, namely, the outside temperature changes or variations, represents a variable to which the heating system is subordinate and to which it must readily respond.

In considering the amount of heat required to maintain a given building or room therein at a predetermined temperature of say 70° F. for various outside temperatures lower than 70° F., it may be considered as accepted that in general the quantity of heat required to maintain such constant inside temperature is substantially proportional to the temperature difference between inside and outside. This disregards varying winds and radiant heat from the sun which, however, does not alter the fundamental truth of the statement.

This means that the heat supply should be substantially in linear relation to the outside temperature variations.

It would appear, therefore, that the problem of heating resolves in a simple problem of providing a direct thermostatic control between outside temperature changes and heat supply.

Apart from the fact that there is no simple and direct way to measure or to control heat in a heating medium, I wish to call attention to the factor of time. A thermostatic or other temperature responsive element must first absorb a certain temperature change before it can react, that is to say, its response lags behind the temperature change and reflects that change only after the same has occurred. The equipment controlled by the thermostatic element and responsive thereto, needs also time to provide the required changes and to control the heat supply suitably to answer the variable requirements of changing outside temperatures.

In other words, there is a cumulative time lag in the operation of any known equipment of this character and the necessary changes in heat supply will accordingly lag behind the variable requirements for heat.

This is true in all heat control systems heretofore devised and affects the heat supply during the rise as well as during the fall of outside temperatures, occasioning waste and general inefficiency.

It is understood, of course, that any properly designed heating system must be correctly proportioned with respect to the space to be heated and the maximum temperature difference between the predetermined inside temperature and the variable outside temperature, taking into account the heating medium which is to be employed and the range of variation of the particular variable of the medium by which the system is to be governed.

A primary purpose of my present invention is the provision of a method and means of anticipating a change of temperature, so that a heating system may be adjusted in accordance with that change previous to its occurrence.

A further object of the invention is to provide this anticipation by means of a specially constructed, multi-step, contact making thermostat, arranged to indicate an approaching condition of temperature before that condition arrives, whether that condition be a higher or a lower temperature.

A further object is to provide an electrical control means, responsive to a thermostat, and controlling the heating system of a building, to effect an anticipatory regulation of that system.

Heating systems and methods and means of regulation are well known to the art, and my invention may be employed with any system which may be subjected to automatic control. I prefer, however, to employ my invention with systems such as are disclosed in my copending applications, Serial No. 356,650, filed April 20, 1929; Serial No. 391,721, filed September 11, 1929; and Serial No. 491,901, filed October 29, 1930. The systems therein described are capable of a flexible and efficient control and are therefore admirably adapted for use with the present invention.

The above mentioned copending applications concern steam heating systems which are controlled partly by the volumetric metering of the steam to the radiators, and partly by varying the pressures in the steam line and the return line. This method of regulation is preferably accomplished in its entirety by means of a motor driven apparatus. This apparatus includes mechanical compensations for the peculiar differences of response of the steam heating system at different temperature adjustments, so that no compensation need be made in the thermostatic equipment itself. Thus the control may be effected by employing a thermostat arranged to communicate responses to the apparatus at a series of points spaced uniformly along the temperature scale, or by varying some electrical condition to which the control apparatus may respond in such manner that its ultimate responses are substantially in linear relation to the variations of temperature, or by any other method providing a response that is proportional to the temperature variations. This linear response to the temperature variations is desirable for the reason that loss of heat through the walls, etc. of a building varies approximately in linear relation to the difference between the inside and outside temperatures.

While the present invention will be preferably employed with a heating plant capable of being regulated in a series of uniform temperature steps, as above described, it is not limited exclusively thereto, for the thermostat may be arranged, within the teachings of my invention, to provide a response that varies in some non-linear relation to temperature so as to effect a proper regulation of the heating system which it controls.

It is obvious that the present method of producing a response in a controlled system in anticipation of a change in a controlling variable, is not limited to its use in the heating of buildings but may be applied to any controlled system having an inherent lag in its response.

In the preferred embodiment of my present invention I divide the temperature range over which the apparatus is to function into a convenient number of spaced temperature steps, and I provide in a contact making thermostat a separate contact for each temperature step. Each of these contacts has associated with it one or more relays arranged to control the regulation of the heating plant. A provision for non-interference of the several relays is obtained by means of electrical interlocking connections between them, but this provision may not be required in all cases, and the need for its inclusion in the device will depend upon the circumstances surrounding each individual installation.

A selector means for coordinating the operation of the control relays and the heat regulating apparatus may be of any conventional type, but I prefer to employ a selector such as described in my above mentioned copending applications, consisting of a series of mercury switches associated with the relay circuits and actuated by the regulating apparatus.

The anticipatory indication of the approaching temperature condition is provided by means of a special and novel arrangement in the thermostat of the movable contact arm in relation to the stationary contact members. The several stationary contacts, each represent a separate and definite temperature, as for example, 30, 35 and 40 degrees, etc. When the contact arm completes a circuit through a particular contact the control apparatus responds to adjust the heating plant for the temperature corresponding to that contact member. The stationary contact members are made quite wide so that, as the contact arm moves in response to temperature changes, it makes contact with a stationary member and completes a circuit therethrough before the occurrence of the temperature to which that particular contact member corresponds.

I have enumerated only the broad objects and features of my present invention. Others will appear as the specification progresses.

The following detailed description is intended to enable others to understand my invention, and is furnished with reference to the accompanying drawings in which.

Figure 1:
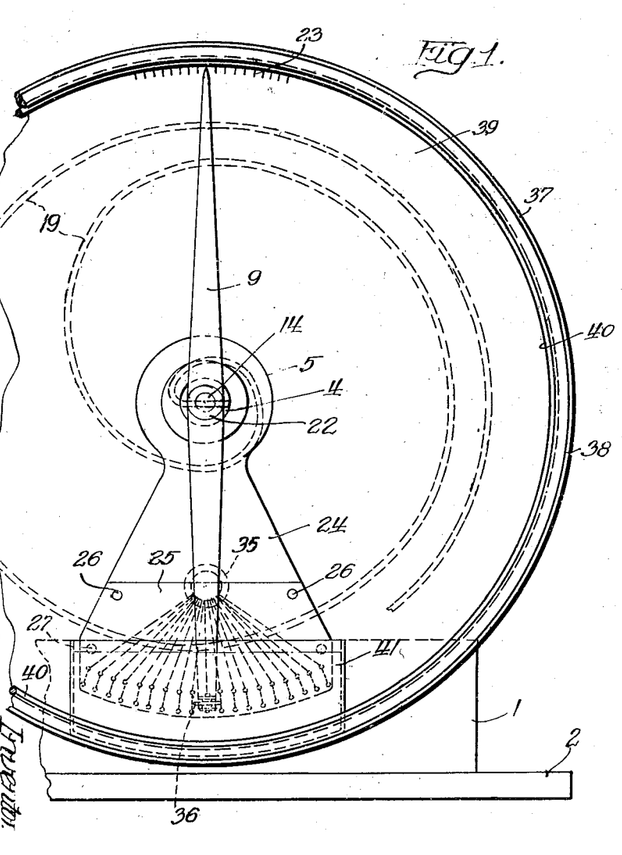
Figure 1 shows the front view of my novel multi-step-thermostat with several parts shown broken away in order to illustrate certain details.
Figure 2:
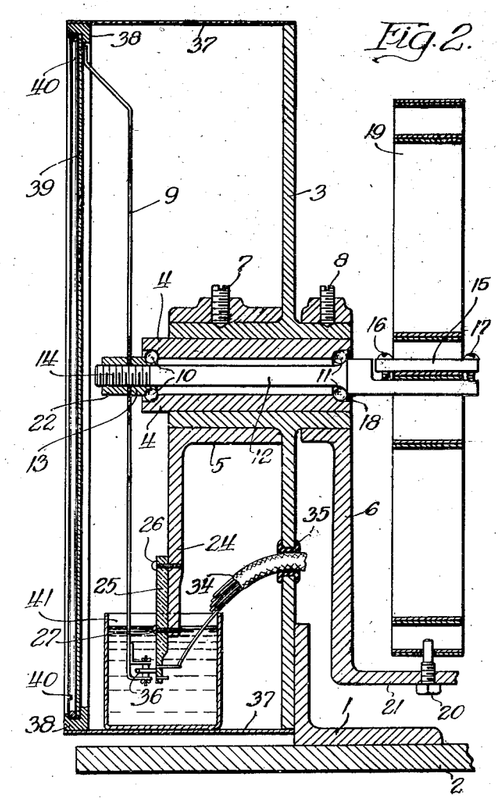
Figure 2 is a cross sectional view of the novel multi-step-thermostat.

Referring first to the thermostat illustrated in Figures 1 and 2 of the drawings, it will be seen that I have provided an angular supporting member designated by the reference numeral 1 which is suitably attached to a base designated by the reference numeral 2. Fastened to the supporting member 1 is the hubbed disc 3 having tubular projections on each side as shown, for receiving the collar 4 which is fitted tightly and driven into the bore of the hubbed disc. Rotatably attached to the left hub of the disc 3 (as viewed in Figure 2) is the crank-shaped member 5, and also rotatably fastened to the right hub of the disc 3 is the crank-shaped member 6. The position of either one of the crank-shaped members 5 and 6 may be adjusted relative to the hubbed disc 3 by means of the set screws 7 and 8 provided in the tubular extensions of the crank-shaped members, as shown in Figure 2 of the drawings. One end of the collar 4 projects slightly from the hub of the disc 3 for providing a suitably spaced support for the contact carrying arm 9. The inside of either end of the collar 4 is suitably formed to receive the ball bearings 10 and 11 for supporting the shaft 12. The play of the shaft 12 within the bearings 10 and 11 may be accurately adjusted by the bearing nut 13 which holds the bearing 10, being attached to the front end of the shaft 12 provided with the thread 14. The rear end of the shaft 12, which is supported by the bearing 11, is provided with a clamp member 15 attached to the shaft by means of screws such as 16 and 17. A felt washer 18 is fitted in the right hand end of the collar 4, over the ball bearing 11, in order to prevent the entry of dust into the bearing 11 and through the tubular collar to the contact equipment.

The inner end of the bimetallic element 19 is clamped to the shaft. A pin screw 20 is attached to the laterally projecting extension 21 on the crank-shaped member 6 and engages a hole in the outer end of the bimetallic member 19. This arrangement allows for radial movement of the bimetallic member 19 and restrains angular movement thereof. The member 6 being fastened to the hub of the disc 3 by means of the set screw 8, and the pin screw 20 fitting neatly into the hole on the outer end of the bimetallic member, the inner end of which is clamped to the shaft 12, it will be understood that temperature variations causing contraction and expansion of the bimetallic member 19 will result in a corresponding rotation of the shaft 12.

Figures 3, 4, 5:
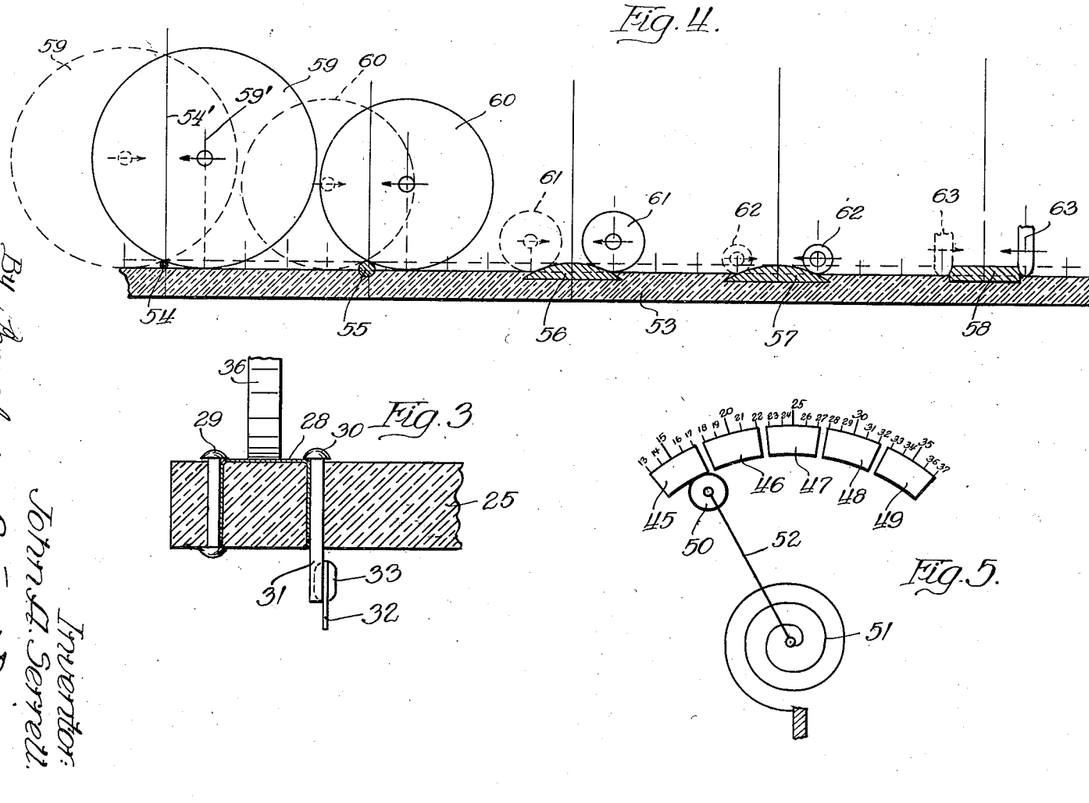
Figure 3 is an enlarged side view of the movable and flexible contacts in the novel multi-step-thermostat.
Figure 4 is a study of contacts in order to explain the action of the movable contact in the novel multi-step-thermostat relative to the stationary contacts.
Figure 5 is a diagrammatic representation of the movable contact and of the stationary contacts in the multi-step-thermostat for further illustrating the action of the movable contact relative to the stationary contacts.

The flexible arm designated by numeral 9 is fastened to the front end of the shaft 12 and clamped thereto by means of the nut 22 which holds this flexible arm against the bearing nut 13. This arm 9 is formed at its upper end into an indicating finger adapted to indicate the temperature variations on a scale 23 as is shown particularly in Figure 1. Attached to the laterally extending portion 24 of the crank-shaped member 5 which is held on the hub of the disc 3 by means of set screw 7 is the insulating plate 25, the attachment being made by screws such as 26 and 27 or the like. This plate carries the stationary contacts of the instrument. Figure 3 shows particularly the manner of attaching a stationary contact to the contact plate 25.

Referring now to Figure 3, it will be seen that the contact plate 25 is shown in cross section illustrating the attachment of one of the stationary contacts such as the one shown in this figure and designated by the reference numeral 28. Such a contact should be made of metal of high melting point such as platinum or Monel metal and may be made in form of staples held in suitable holes in the insulating plate 25 by means of soft metal pins such as 29 and 30. One of these pins, such as the pin 30, extends through the insulating plate 25, as shown at 31, and attached to this extension of the pin 30 is the wire 32, the attachment being made by ordinary solder such as indicated at 33. Each of the contacts in the insulating plate 25 is attached in this manner and provided with a wire such as 32. The pin 29 is shown as a rivet while the pin 30 is merely pushed through the corresponding hole in the plate or panel 25. It will be understood that this representation is merely by way of example and not to convey details of construction. Any suitable attachment may be adopted for fastening the contacts.

Referring again to Figure 2, it will be seen that the wires extending from the contacts in the contact plate 25 are assembled in a cable such as indicated by reference numeral 34, and this cable 34 is tightly fitted in the opening provided by the bushing 35 which is fastened in the disc 3. The contacts and their connecting wires are illustrated more or less diagrammatically in Figure 1 by means of dotted lines. The cable extends to the control equipment which will be described presently, the equipment being located at some convenient place in the building while the multi-step-thermostat is located in the open, as on the roof or any suitable place.

The lower end of the arm 9 is fitted with a contact wheel or roller 36. The arm is of elastic material and is adjusted so that the roller 36 merely touches the contact plate between contacts but bears with some pressure upon the contacts on the insulating plate 25. The contact wheel or roller 36 is designated by the same reference numeral in Figure 3.

A cylindrical casing ring 37 is attached to the hubbed disc 3, the attachment being made either by means of screwing the casing 37 to the disc 3 or the like. Attached to the casing ring 37, at the front end thereof, is a case ring 38. This latter case ring 38 is provided with a recess as shown, and removably fitted in this recess is the glass face 39. The fitting may be made by means of a flexible wire ring such as indicated by the reference numeral 40, and a gasket may be interposed between the recess of the casing ring 38 and the glass face 39 in order to make the attachment of the glass face dust proof. The temperature scale 23 indicated in Figure 1 may be provided either on an extension of or attachment to the case ring 38 or on the glass face.

A vessel 41 is provided at the bottom of the case ring 37 conforming to the inner face of the case ring 37. The contact plate 25 carrying the stationary contacts extends into the vessel 41. The vessel is filled with insulating oil and all stationary contacts and also the movable contact 36 are submerged in the oil in order to prevent arcing when the movable contact leaves the stationary contacts in the course of its operation.

In order to assemble the instrument properly and to adjust the same, the pin screw 20 may be removed or set back, the shaft 12 rotated by hand in order to adjust the movable contact relative to the stationary contacts, whereupon the pin screw 20 may be replaced, thus adjusting the bimetallic member 19 properly in place. The roller contact 36 may be adjusted relative to the stationary contacts for any total range of temperatures by loosening the crank-shaped member 6 and fastening the same again to the hub of the disc 3 when the total range of temperature is properly adjusted.

It will be seen from the above description that the multi-step-thermostat is a temperature responsive element having a plurality of stationary contacts and a movable contact adapted to establish connection with the stationary contacts in accordance with the contractions and expansions of the element which responds to temperature variations, that is of the bimetallic member which is exposed to the outside.

Some of the novel structural features to which I want to call attention in connection with the multi-step-thermostat as far as I have described the same, are enumerated below:

The construction of this thermostat gives the possibility of exchanging the flexible arm 9 as well as the contact carrying panel 25 for an arm and cooperating panel of different dimensions.

It may be desirable, for example, to change the predetermined fractional steps of temperature variations which are represented by the stationary contacts in order to effect a control of the output in accordance with different predetermined steps or degrees of temperatures. Such changes may call for a different arrangement of stationary contacts (either a different number of contacts or different dimensions thereof) and, accordingly, for a different movable contact cooperating with the new arrangement of stationary contacts.

Such change can be readily effected by simply removing the panel 25 and replacing it by a suitable other panel carrying another predetermined set of contacts. If another cooperating movable contact is required, it can be easily mounted in place of the flexible contact arm shown.

It may be required to replace the thermostatic element 19 by another element. Variations between the coils may be easily corrected to obtain approximately the same effect from coils of about the same dimensions, by simply substituting another contact arm. It will be seen that the general scheme includes the thought of such a change. The stationary contacts are positioned (exchangeable) on a radius greater than the normal radius of the roller (on the exchangeable contact arm). If it is desired to install a different thermostatic element, calling for another contact arm, a longer or shorter arm may be substituted as the test of the coils for arc per degree indicates to be necessary.

The manner of attaching and adjusting the thermostatic element as shown represents another feature which will be found convenient and dependable.

Differently shaped stationary contacts may be employed such for example, as screws projecting from the contact plate.

All contact parts are enclosed dust and moisture proof. They are submerged in oil to prevent arcing and to assist in gaining effective circuit changes with a minimum of effort on the part of the thermostatic element.

The flexible contact arm assists in adjusting the desired contact pressure with a minimum of skill and effort. It is, of course, understood that the contact arm and the roller contact thereon may be constructed differently. Special anti-friction provisions may be included in the mounting of the roller if desired. Likewise, the tension and adjustment of the contact arm may be determined by special bracket and adjusting-screw provisions attached to the end of the shaft and cooperating with the contact arm.

The thermostatic element is placed so that it receives full temperature variations. A shell or cover may be provided for shielding the element against damage or direct rays of the sun.

The contact arm serves a double purpose. It carries the movable contact and it also cooperates with the temperature scale in order to indicate mean temperatures of the thermostatic element.

The construction is adapted to mass production since all parts are designed in accordance with the principles called for by standardization. The assembly is likewise simple and insures accuracy and dependability of operation without demanding special manual skill.

I have said previously that the stationary contacts are placed, proportioned and coordinated with the movable contact roller in such a manner as to give indications (impulses) anticipatory of predetermined steps of temperature variations, so that the control equipment can respond prior to and in anticipation of a predetermined fractional step of temperature. The control equipment in turn causes the operation of apparatus to regulate the heat output in accordance with the anticipated predetermined step of temperature change before the change corresponding to the step has actually occurred. The cumulative time lag in the operation of the governing element (thermostat) and the control and operating equipment is thereby taken care of and a better coordination between demand and supply of heat is effected, increasing the efficiency and economy of the system.

I shall now proceed to explain this particular function of the novel multi-step-thermostat.

It should be borne in mind that the total working range of temperatures is divided into fractional predetermined steps or degree, of say five degrees apart. Each contact in the thermostat represents such a predetermined step. Whenever the movable contact engages a stationary contact, an impulse is given to the control equipment, causing the same to actuate apparatus which regulates the heat supply in accordance with the demand indicated by the engagement of the movable contact with the stationary contact, the latter representing the predetermined fractional step in the total working range of the temperature variations. When the heat output regulation is effected, i. e., when the regulating apparatus is adjusted so that the radiators may yield a heat output to compensate for the predetermined step in temperature, the function of the movable and stationary contacts ceases. The circuit over which the governing impulse was transmitted from the corresponding stationary contact to the responsive control equipment is interrupted.

The movable contact is now in engagement with the stationary contact to which it has been moved by the temperature variation effective to the thermostatic element. Nothing happens as long as there is no variation in temperature in either direction.

The stationary contact on which the movable contact rests is of a certain predetermined width. Adjacent this stationary contact and separated therefrom by a predetermined space are stationary contacts of like construction, each representing a predetermined fractional step of temperature variation above and below the fractional degree which is denoted by the first stationary contact (on which rests the movable contact in the condition under discussion). For example, if the middle contact is assumed to represent the predetermined fractional step corresponding to twenty degrees (assuming that the steps are five degrees apart) the adjacent stationary contacts will represent the fractional steps corresponding to 15° F. and 25° F., respectively. It is understood, of course, that the division may be smaller or larger, as desired.

A point or step denoting a certain predetermined temperature, such as 15°—20°—25° F., does not extend over the entire width of a corresponding contact, but is located at the center of the contact.

This condition may be seen particularly in the diagrammatic Figure 5.

It will be seen from this Figure 5 that I have shown five stationary contacts, designated by the reference numerals 45 to 49, inclusive. The movable contact designated by the numeral 50 is mounted on the arm 52 which is adapted to be rotated in accordance with temperature variations under the action of the thermostatic element 51.

It will be assumed now that the temperature is rising. The movable contact 50 has established connection with the stationary contact 45. Immediately on leaving the previous contact and touching the left edge of the contact 45 an impulse was transmitted to the control mechanism. This impulse occurred at 13° F. since the width of the contact 45 covers a certain space below and above the predetermined fractional step of temperature variation. Thus, the control equipment was actuated at 13° F., i. e., it was actuated anticipatory of the predetermined fractional step which is in this case 15° F.

The control equipment was therefore started ahead of the predetermined step (15° F.) and caused the actuation of apparatus to regulate the heat output to compensate for the heat variation in accordance with this predetermined step (15° F.).

The regulation of the heat output to compensate for this predetermined step is, therefore, well under way before the predetermined step has actually occurred and may be completed when it has occurred. The time lag is eliminated. The circuit from the corresponding stationary contact 45 to the control equipment is interrupted and the actuation of the control equipment is terminated when the heat output is properly regulated.

The movable contact 50 continues now in its travel during further rise of the temperature and slowly wipes over the stationary contact 45 without producing any particular effect. It will finally leave the contact 45 when the temperature approaches 18° F. and immediately establish connection with contact 46 (without bridging the intervening space between the contacts 45 and 46). Another impulse will be delivered to the control equipment in response to the rising of the temperature, indicating the approach of the next fractional predetermined step which is 20° F. The equipment will immediately respond and regulate the heat output anticipatory of the demand to compensate for the approaching step of 20° F. and will again interrupt the circuit when this compensation is accomplished.

The above described cycle is repeated whenever the movable contact 50 leaves a stationary contact and establishes connection with the next stationary contact. It is assumed, of course, that the temperature continues to rise.

However, if it is assumed that the temperature falls after the movable contact has established connection with a stationary contact, such as the contact 46, the operation will be in reversed order as follows: The operation of the control equipment was started to regulate the heat supply in anticipation of 20° F. and the temperature instead of continuing in a rising tendency to approach the anticipated 20° F. step, falls now from 18° to 17° F.

It must be considered first that a temperature rise or fall does not occur precipitately. However, if such fall (or rise) occurs, the response will be as follows:

The equipment has started the control when the movable contact reached the edge of the stationary contact 46 (at 18° F.). It continues its function and regulates the heat supply in anticipation of the approaching predetermined step of temperature variation which is 20° F. The movable contact 50 reestablishes connection with contact 45 at 17° F. An impulse is therefore transmitted to the control equipment in anticipation of the approaching predetermined step of 15° F. The control equipment will respond and will re-set the heat supply to the previous adjustment.

It will be seen, therefore, that, whatever the assumed condition might be, the novel multi-step-thermostat will in any case deliver an anticipatory impulse to the control equipment to start the operation thereof prior to the approach of certain critical points in the outside temperature variations. It is evident that the multi-step-thermostat incorporating this feature is not at all limited in its use to any particular system but may be applied wherever anticipatory indication of an approaching critical predetermined step in temperature variation is desired.

It will be apparent from the discussion rendered above with reference to the drawings shown in Figure 5 that the anticipation, that is to say, the delivery of impulses anticipatory of predetermined steps of temperature variations, is the result of the cooperation of the movable contact piece with the stationary contact pieces.

The extent to which an anticipatory impulse is being given in any case depends on the form and size of these cooperating contact pieces and on the angular advance of the movable contact. The term—extent—signifies in this connection the degree of anticipation of a predetermined step of temperature. The dependence of the cooperating contact pieces on each other will be realized when it is considered that a stationary contact signifies a certain fraction of predetermined temperature variations within the working range, while the movable contact piece signifies, in any position, a certain step of temperature depending upon the operation of the thermostatic element. In other words, any position of the movable contact piece is a function of the varying temperature and expresses this temperature relative to the stationary contact pieces, each of which covers a certain fraction of the working range and includes a predetermined step within this fraction. Therefore, the actual step of temperature (represented by the position of the movable contact) is brought into relation with a predetermined step of temperature (represented by a stationary contact.) This relation is determined by the angular advance of the movable contact and by the forms of the cooperating contacts.

The function of the movable contact relative to the stationary contacts will be better understood from a brief description of the study of contacts which is illustrated in Figure 4, and I will therefore, discuss this figure next.

Referring now to Figure 4, I have shown therein a base 53. Mounted on this base, which may be of insulating material, are five contacts, designated by numerals 54 to 58, inclusive. These contacts are assumed to represent stationary contact pieces. In order to study the operating effect of the movable contacts relative to the stationary contacts, I have shown contacts of different forms cooperating individually with each other. The angular advance of the contacts is assumed to be the same. The movable contacts are designated by the numerals 59 to 63, inclusive. They advance relative to the stationary contacts on a radius, angularly from right to left and from left to right as indicated by the arrows on each of the movable contacts, and in doing so, they make connection with the left and the right sides of the corresponding stationary contact. The angular advance of the different forms of contacts is, as I have said, above, the same. The angular degree of rotation of a movable contact during which it touches the stationary contact is measured by the chords drawn parallel with the plane of the contact plate through the points where the movable contact piece touches the side of the stationary contact piece. That is, half chords of the movable contact piece plus the sum of two partial chords of the stationary contact piece.

Now, considering first the action of the movable contact 59 relative to the stationary contact 54, it will be seen that in this case the stationary contact 54 is relatively small as compared with the movable contact 59. The general shape of the movable as well as the stationary contact is in this case the same, that is to say, the shape of the contacts is assumed to be circular. The movable contact may be a roller or the like, and the stationary contact may be a suitable piece of wire. The movable contact 59 is assumed to be carried by an arm which is under the control of a thermostatic element. The radius on which the movable contact 59 advances corresponds, therefore, to a certain temperature step. This temperature step, it will be recalled, is to be brought in a certain relation with a predetermined step of temperature variation as determined by the stationary contact 54. This relation is accomplished in the moment when the movable contact 59 touches the stationary contact 54 in its movement from left to right or from right to left, that is, when the movable contact (during the latter direction of movement) assumes the position shown in full lines in the drawings, touching the stationary contact 54 on its right side. During movement from left to right, the movable contact will touch the stationary contact on its left side as indicated in dotted lines.

In the particular case under discussion the degree or extent of anticipation of the predetermined step of temperature (represented by the stationary contact 54) will be determined in either direction of movement (temperature variation) by the sum of the half chord of the stationary contact plus the half-chord of the roller contact. The chords are drawn parallel with the plane of the contact plate through the points where the movable contact touches the stationary contact. That is, the extent of anticipation equals the temperature change represented by the distance between the vertical lines 54' and 59'. In the other direction of movement of the contact 59, responsive to temperature variation in the other direction, the anticipation will, of course, be the same, the position of the movable contact relative to the stationary contact in the other direction of movement being indicated by dotted lines. It is understood of course that the anticipation occurs, in either direction of movement, at the moment when the movable contact touches the stationary contact. During its further movement, the movable contact will ride over the stationary contact, advancing the actual step of temperature toward the predetermined step (represented by the stationary contact) lining up the actual temperature step with the predetermined step, and during further progress in temperature variation in one direction, the movable contact will leave this step and advance toward the next predetermined step. However, the control equipment is started at the moment when the movable contact touches the stationary contact, i. e., it is started in anticipation of the predetermined step represented by the stationary contact.

The conditions prevailing in case of the contacts 55 and 60 will now be examined. It will be recalled that the angular advance of the movable contact is assumed to be the same as in the first case discussed above. The forms of the cooperating contacts are shown to be different, the size of the movable contact 60 being reduced and the size of the stationary contact 55 being slightly increased, as compared with the contacts 54 and 59.

With the above explanations in mind, the remaining examples of cooperating contacts 56—61, 57—62 and 58—63 will be easily understood without additional detailed discussion. The angular advance is in each case assumed to be the same, while different forms of contact are shown for the purpose of illustrating the possibilities of employing differently formed contacts and of showing the effect graphically. Each of the movable contacts 61, 62 and 63 must be imagined to be attached to an arm or rod which is under the control of a thermostatic element, capable of advancing the corresponding movable contact angularly from left to right and from right to left relative to the cooperating stationary contact. When a movable contact touches the right side of the corresponding stationary contact (as shown in full line) in the course of its movement from right to left, an impulse will be given anticipatory of the predetermined step (stationary contact) to start the equipment in the proper direction. During temperature variations in reverse direction, the movable contacts will travel from left to right and touch the corresponding stationary contacts, as is indicated in dotted lines.

Now as to the relative merits of the various forms of contacts, the conditions shown by the cooperating contacts 54—59 is favorable since it causes less variation due to friction. However, each of the forms shown has its advantages. As I have said previously, my invention is not limited to any specific form of contact. The stationary contact may be made in the form of a plate contact, the heads of screws may be employed, or wire contacts may be used to advantage if desired.

Figure 6:
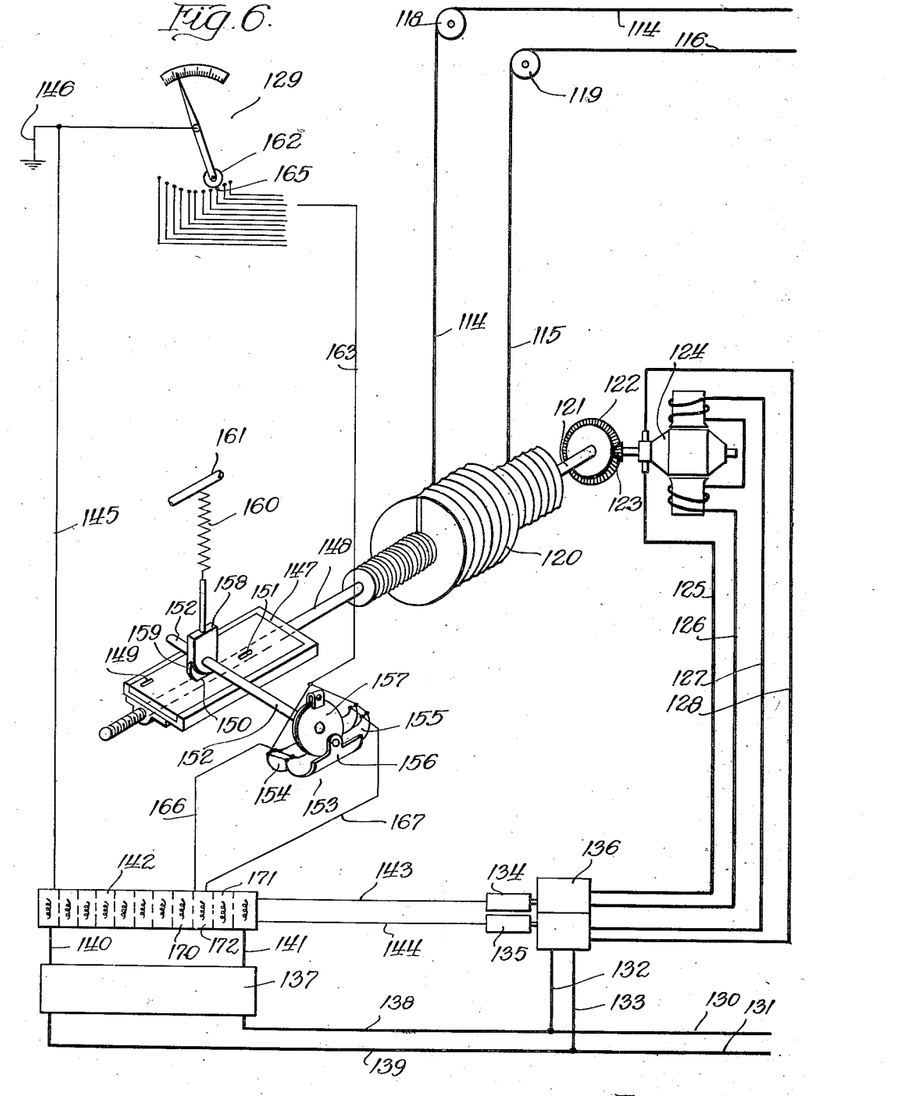
Figures 6 and 7, when placed side by side with certain lines in alignment, represent a complete system of heat control. Several control apparatus are shown in these figures diagrammatically as will be explained later in detail.
Figures 7, 8:
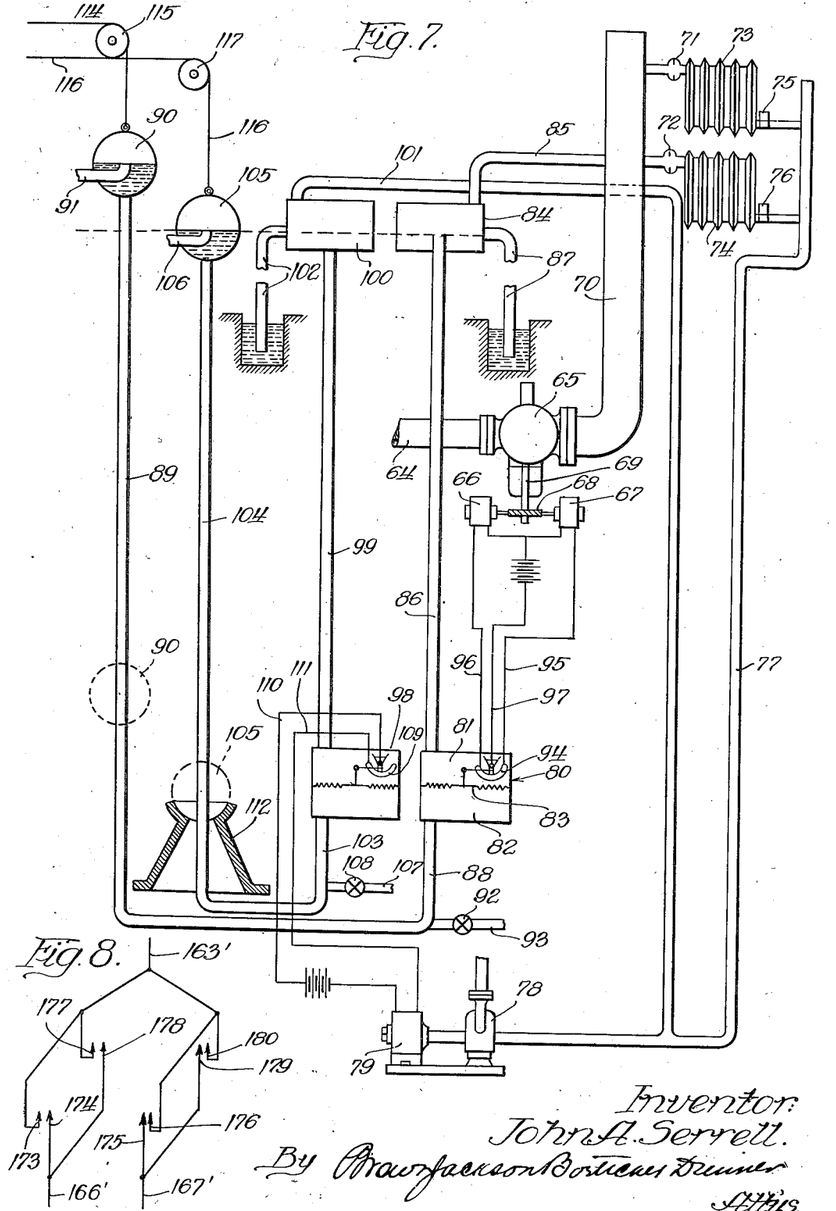
Figure 8 is a diagrammatic representation of certain contact mechanisms used in the selector shown in Figure 6.

It is believed that the above discussion of the operation of a movable contact relative to stationary contacts will be sufficient for conveying the function of the multi-step-thermostat. I will, therefore, proceed with describing the manner in which the multi-step-thermostat controls the heat supply regulation in a heating system of the character previously defined. This description will be rendered with reference to the Figures 6, 7 and 8. Figures 6 and 7 when placed side by side with the Figure 7 to the right of Figure 6 show a complete heating system in a diagrammatic representaton, while Figure 8 illustrates a diagrammatic sketch of certain contacts. Certain parts of the heat supply regulating system as shown in Figures 6 and 7 correspond to the system disclosed in my previously mentioned copending applications. I shall therefore give only a brief outline of the operation of the system, and shall concentrate more particularly on the function of the control system which shows novel features.

Referring now to Figure 7, I have shown in this figure a steam supply line designated by the numeral 64. This steam supply line terminates in a regulating valve 65, the function of which may be controlled by means of the motors 66 and 67 through a worm gear 68. Depending upon which of the motors 66 and 67 is actuated the worm gear will rotate and actuate the shaft 69, thereby opening or closing the valve 65 and more or less restricting the steam supply through the valve 65 to the supply main 70. Connected to the steam supply main 70 are the orifices 71 and 72 of the radiators 73 and 74. It is understood, of course, that any number of radiators according to the capacity of the heating system may be connected to the supply main 70. Each radiator is equipped with a steam trap as indicated by the reference numerals 75 and 76. The use of the steam trap is optional, as will be remembered, depending upon the mode of operation which is adopted for the second part of the heating range, that is to say, for that part of the heating range which serves the demands of severe weather during which the heat is controlled by progressively increasing the pressure differential upon the orifices of the radiator and thereby increasing the temperature of the steam while keeping the radiators filled with steam. This condition has been mentioned at another place of this specification and is in detail discussed in the last mentioned copending application (Serial No. 491,901) so that calling attention to the situation will suffice for an understanding of the functions.

The steam traps (if such traps are provided), are connected to the return line of the system designated by the reference numeral 77. The return line, it will be seen, terminates in a vacuum pump 78 which may be operated by the motor 79.

The variation of the pressure differential throughout the entire heating range of the system may obviously be controlled by actuating the motor 79 for the return pressure and the motors 66 and 67 for the supply valve 65 in accordance with a predetermined mode of operation. This general scheme of operation has been discussed previously and details may be looked up in the corresponding copending application Serial No. 491,901 which I have listed at various places.

The operation of the motors 66 and 67 which control the steam supply valve 65 is under the control of an instrument designated by the numeral 80 which I term "pressurestat". This pressurestat comprises generally two chambers 81 and 82, which are separated by a diaphragm 83. The position of the diaphragm will depend upon the relative pressures which are obtained in the chambers 81 and 82 respectively. This pressure may be varied and controlled by the fixed accumulator designated by the reference numeral 84 which is connected to the supply main 70 by means of the pipe 85. The pipe 86 connects the fixed accumulator 84 with the chamber 81 of the pressurestat 80. A pipe connection 87 leads from the fixed accumulator to a ground well and serves as an overflow connection. The pressure maintained in the chamber 81 of the pressurestat 83 will therefore depend on the pressure which is maintained at any time in the supply main 70. The lower chamber 82 of the pressurestat 80 is connected by a pipe connection 88 and by flexible hose 89 to a variable accumulator 90 provided with an overflow connection 91. Obviously, by lowering or elevating the variable accumulator 90, the pressure in the lower chamber 82 of the pressurestat 80 may be varied if it is desired to unbalance the equilibrium of the diaphragm 83. A valve 92 interposed in a pipe connection 93 leading to the hose 89 of the variable accumulator 90 provides for supplying liquid to the head of the variable accumulator 90.

Now, when the variable accumulator 90 moves in accordance with a certain predetermined scheme of operation, it will be evident that the pressurestat 80 can be controlled as desired to regulate the operation of the motors 66 and 67. It will be seen that the diaphragm 83 is provided with a lever arrangement adapted to tilt a rocking contact arrangement 94. By tilting the contact arrangement 94 under the influence of the operation of the variable accumulator 90, a circuit may be established over the starting wires 95 or 96 and the common wire 97, for actuating the motor 66 or the motor 67 respectively, as desired.

The motor 79 for operating the vacuum pump 78 is under the control of a pressurestat 98 which corresponds structurally to the pressurestat 80. The upper chamber of the pressurestat 98 is connected by pipe 99 to a fixed accumulator 100 which is connected to the return line 77 by means of the pipe connection 101. An overflow connection 102 connects the fixed accumulator 100 with a ground well. The lower chamber of the pressurestat 98 is connected to a pipe 103 and to a flexible hose 104 which terminates in a variable accumulator 105. This latter accumulator is also provided with an overflow connection 106 similarly to the variable accumulator 90 previously discussed, and a connection 107 supplies liquid into the head of the variable accumulator 105 by means of the valve 108. Depending upon the position of the variable accumulator 105, the pressure in the pressurestat 98 will be adjusted to actuate the motor 79 for operating the vacuum pump 78, by means of a contact arrangement 109 adapted to close and open the circuit of the motor 79 over the circuit connections 110 and 111. The stand 112 is provided for receiving the variable accumulator 105 in a resting position for holding the return line pressure constant, the variable accumulator 105 resting in this part of the heating range on the stand 112, as indicated by dotted lines, while the supply line pressure can still be varied by means of moving the variable accumulator 90. The relative positions of the variable accumulators 90 and 105 are indicated by dotted lines during a certain period of the operating cycle. A cable 114 operating over a pulley 115 is provided for elevating and lowering the variable accumulator 90. A cable 116 operating over a pulley 177 is provided for elevating and lowering the variable accumulator 105.

Now referring to Figure 6, it will be seen that the cables 114 and 116 are operated over pulleys 118 and 119, respectively, and are adapted to wind upon different diameters of the drum 120. The purpose of the different diameters of the drum 120 serves the differential regulation of the variable accumulators 90 and 105 during the various parts of the heating range. This operation is discussed in detail in the last mentioned copending application Serial No. 491,901 and need not be repeated here.

The drum 120 is mounted on a shaft 121 to which is connected a bevel gear 122 adapted to be operated by bevel gear 123 for rotating the drum in one or the other direction depending upon the control mechanism for regulating the heat supply in accordance with falling or rising temperature. As an operating element I have shown a series motor designated by the numeral 124 which is reversible and may be actuated by the control equipment over the wires 125, 126, 127 and 128.

The governing element shown in Figure 6 is a multi-step-thermostat of the structure described previously and is designated in Figure 6 by the reference numeral 129. The current for the operation of the electric control equipment including the motor 124 is supplied from a common current source over the wires 130 and 131. The current source may be a commercial source of say 110 volt alternating current which is usually supplied. Branch connections 132 and 133 are provided from the supply wires 130 and 131 to contacts 136 operated by the relays 134 and 135. Connected to these contacts 136 are the control wires 125 to 128, inclusive, for controlling the operation of the reversible series motor 124 directly from the commercial current source supplied over the wires 130 and 131.

It will be observed that I have indicated the relays 134 and 135 as well as the contacts 136 operated by these relays merely diagrammatically. I have done this for convenience sake in order to illustrate the general layout and the operative character of the individual parts of the system in as simple a manner as possible. A detailed description of the operating arrangement will follow presently.

A transformer designated by the reference numeral 137 is also directly connected to the current supply by means of the wires 138 and 139. The purpose of this transformer which will also be described in detail later on is to supply low voltage to the control relay mechanisms in accordance with one object of my invention which is directed to the feature of operating the control relays by low voltage while actuating the motor mechanism by high voltage.

The low voltage is supplied to the relay mechanism indicated in the rectangle designated by the reference numeral 142 over the connecting wires 140 and 141. It will be seen that I have shown in the rectangle 142 a number of relays. The number of relays employed in the system is in a certain relation to the number of control contacts of the governing multi-step-thermostat. There are two control relays for each stationary contact in the thermostat. One of these control relays controls the actuation of the motor 124 in one direction while the other relay is provided for controlling its actuation in the other direction of temperature variations. The relays 134 and 135 are provided in common to the relays shown in the rectangle 142 and connected thereto by the wires 143 and 144. Each of the relays shown in the rectangle 142 diagrammatically represents therefore in reality two relays, one adapted to control the operation of the common starting relay 134 over the wire 143 and the other adapted to control the operation of the common relay 135 over the wire 144. Depending upon which of the relays 134 or 135 is operated by any one of the pairs of relays in the rectangle 142, the contact arrangement 136 will be actuated to operate the motor 124 in one or the other direction. A common wire 145 which may be grounded in the multi-step-thermostat 129, as is indicated at 146, is connected to the relay arrangement.

I have shown in Figure 6 a mechanism comprising a plate 147 in screw engagement with the shaft 148. This shaft 148 is connected with the drum 120 and will rotate with the drum when the latter is operated by the motor 124 over the bevel gears 122 and 123. When this is the case, the shaft 148 will rotate and thereby move the plate 147 in one or the other direction depending upon the operation of the motor 124. Now, the motor 124 operates only when a demand for regulation of heat supply is present, that is, the motor 124 operates only in response to the operation of the governing thermostatic element 129. When the motor 124 is actuated it operates the cables 114 and 115 over the pulleys 118 and 119 and over the pulleys 116 and 117 in Figure 7 in order to elevate or to lower the variable accumulators 90 and 105 in Figure 7 and thereby regulate the heat supply as was discussed previously. The moving of the plate 147 in Figure 6 is therefore contingent upon the operation of the drum 120, that is, the control element for the plate 147 is moved simultaneously with the regulation of the heat supply. I have shown this plate 147 movable in a horizontal plane by means of a screw connection, for the sake of simplicity. It is, of course, understood that it may be made operable in this manner in practice if desired. There is however an alternate operation, namely, the combination of the movable element 147 with the cables 114 and 115. The control element 147, in other words, may be a roll and move up and down with the cables controlling the variable accumulators. There are recesses provided in the control element 147 which are designated in Figure 6 by the numerals 149, 150 and 151. The arrangement of these recesses in the movable element 147 corresponds to a predetermined curve as particularly discussed in the previously mentioned copending applications. Each recess is provided for operating a rocking shaft such as 152 to which is connected a contact arrangement generally designated by the numeral 153.

There are as many rocking shafts and corresponding contact mechanisms provided as there are stationary contacts in the governing thermostatic element 129. Each contact mechanism comprises a pair of glass vessels such as 154 and 155. On each side of each glass vessel are contacts and these contacts are connected in multiple according to the scheme shown particularly in Figure 8. A mercury globule is adapted to close the circuit on each side of each of the glass bulbs 154 and 155, thereby establishing certain circuit connections. Whether the contacts on the left or the right ends of the glass bulbs 154 and 155 will be operated by the mercury globule within the glass bulbs will depend on the position of the switch which depends in turn on the position of the rocking shaft such as 152. The glass bulbs 154 and 155 of each switch are mounted on the rocking shaft by means of a bracket arrangement indicated by the reference numeral 156 which is in the form of a cradle holding the glass bulbs in engagement with the member 157 mounted on the shaft 152. The shaft as shown in Figure 6 is held in a bracket member 158 which is provided with a roller 159 and with a spring 160 attached to a frame part designated by numeral 161. The spring 160 is provided for biasing the bracket 158, and therefore the rocking shaft 152. The roller 159 is adapted to establish connection with the corresponding recess such as 150 (or 149—151 for other rocking shaft) on the movable control element 147 which may be movable by the screw arrangement cooperating with the shaft 148, or may be in tape or belt form and movable with the cables 114 and 115. If the latter arrangement is provided, the movable element 147 may be likened to a music roll.

The mechanism comprising the member 147 and its associated rocker arms and switches 153 constitute a selector device which determines the direction in which any particular adjustment of the heating apparatus shall be made, and also terminates the operation of the adjusting motor 124 when the proper adjustment of the apparatus has been obtained. The operation of the selector is as follows:

When the movable contact 162 of the thermostatic governing element 129 establishes engagement with a stationary contact, an impulse will be delivered over its associated individual wire such as 163 to its associated rocking switch such as 153, depending on the stationary contact which is involved in the operation of the thermostatic element. (It will be remembered that there are as many rocking switches 153 as there are stationary contacts in the thermostatic governing element). The rocking switch 153 will be positioned to complete the circuit to the proper relay 172 to secure an adjustment of the regulating apparatus in the required direction by means of the motor 124. This arrangement of the switch 153 is a result of a previous operation of the regulating device. The operation of the motor 124 thus started continues until the member 147 has moved to such position as to open the switch 153, whereupon the adjustment is terminated.

The recesses such as 149, 150 and 151 in the movable control member 147 which engage the rocking switches to operate the same are positioned in accordance with the relation existing between the temperature steps and the amount of adjustment required of the regulating apparatus. These recesses in the member 147 therefore determine and control the non-uniform mechanical adjustments of the heating plant to provide a regulation thereof in a series of uniform temperature steps.

In Figure 8 is shown a diagrammatic layout of the manner in which the contacts in the rocking switch such as 153 are connected. The connection 163' corresponds to the wire 163 in Figure 6; the connection 166' corresponds to the starting wire 166 in Figure 6; and the connection 167' corresponds to the starting wire 167. The contacts 173 and 174 are located in the left end of one of the glass bulbs such as 155; and the contacts 177, 178 are located in the left end of the other bulb. The contacts at the right end of the first bulb are designated in Figure 8 by the reference numerals 175 and 176, while the contacts located in the right end of the other bulb are designated by the numerals 179 and 180. A mercury globule is adapted to close the circuit from the wire 163' to the wire 166' over the contacts 173 and 174 in the first mentioned glass bulb, or over the contacts 177 and 178, or to close a circuit from the wire 163' to the wire 167' over the contacts 175 and 176 on the other side of this glass bulb. The contacts 173 and 174 are multipled with corresponding contacts 177 and 178 in the left end of the other glass bulb, and the contacts 175 and 176 are likewise multipled to the contacts 179 and 180 in the right end of the other glass bulb. A mercury globule in the other glass bulb is adapted to close the circuit over the multiple contacts 177—178 or 179—180, depending on the position of the switch. It is understood, of course, that only one such mercury switch may be provided and that I have shown two switches multipled as shown in Figure 8 merely for the sake of giving an example.

The arrangement of the controlling relays and their function will now be described more in detail with reference to the Figures 9 and 10. These figures should be placed side by side with the Figure 10 to the right of the Figure 9 with corresponding lines in alignment.

Figure 9:
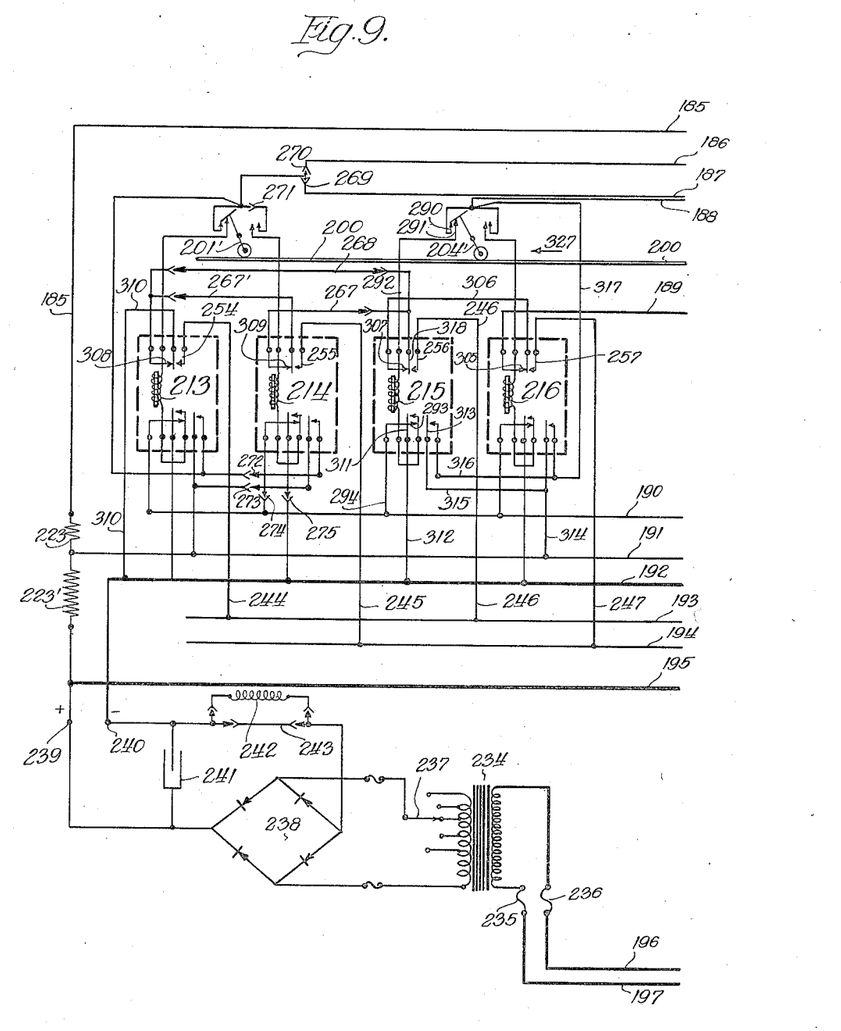
Figures 9 and 10 when placed side by side show the electrical control mechanisms of the invention, together with certain other control mechanisms in diagrammatic representation.
Figure 10:
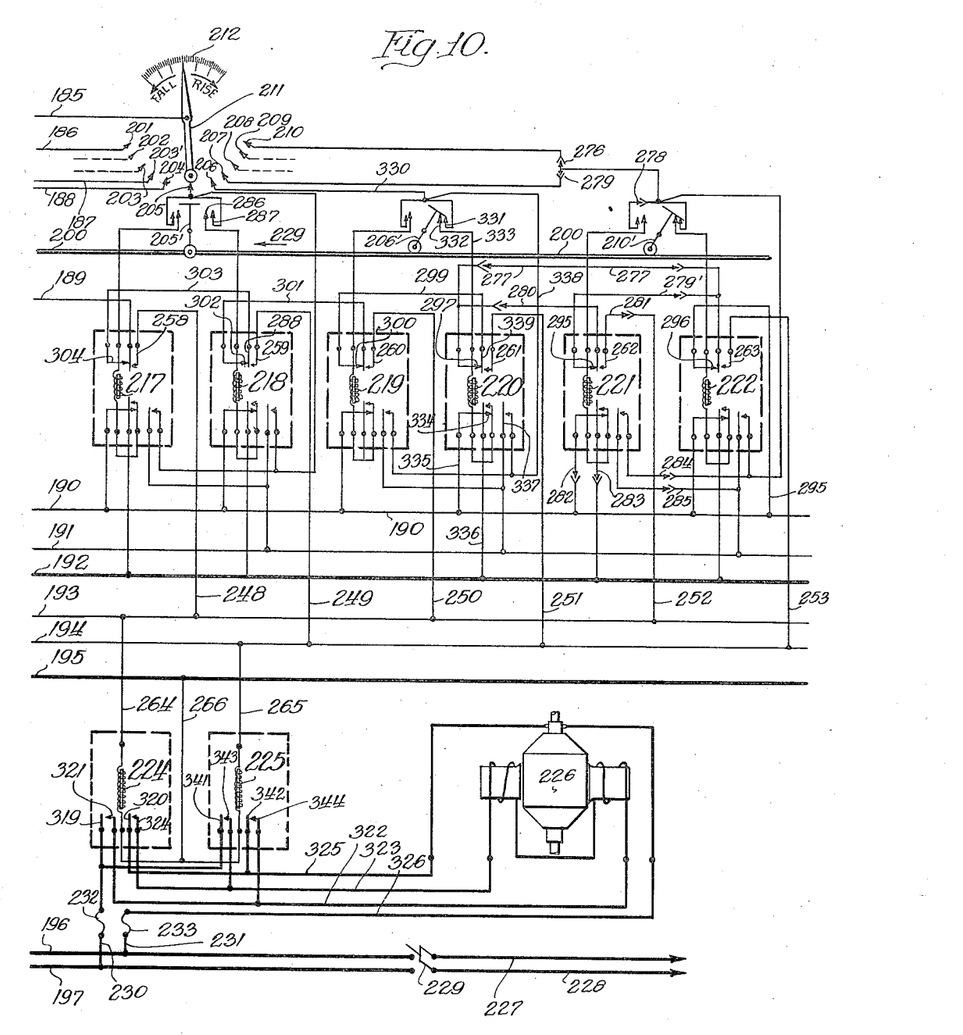

Referring now to Figures 9 and 10, I have shown a multi-step-thermostat provided with a number of stationary contacts designated by the reference numerals 201 to 210, inclusive. An arm 211 is provided at its lower end with a roller contact adapted to establish connection with any one of the stationary contacts. The upper end of the arm 211 is formed into a finger and cooperates with the temperature scale 212 in order to indicate the main outside temperatures. The arm 211 is connected over a wire 185 and over a low resistance 223 (which may be approximately 10 ohms) to a grounded wire 191.

The relay equipment comprises a pair of relays for each of the stationary contacts in the thermostatic element. Only five of these stationary contacts are shown to be connected with corresponding relays and, accordingly, only five pairs of relays are shown. These relays are designated by the reference numerals 213 to 222, inclusive. The relays 213 and 214 cooperate with the stationary contact 201. The pair of relays 215—216 cooperate with the stationary contact 204. The pair of relays 217—218 cooperate with the stationary contact 205. The relays 219—220 cooperate with the stationary contact 206. And the relays 221—222 cooperate with the stationary contact 210.

Interposed between each pair of relays and the corresponding stationary contact in the thermostatic element is a mercury switch, such as the one designated by the reference numeral 153 in Figure 6, which was described previously. The mercury switches are designated in Figures 9 and 10 of the drawings by the reference numerals 201', 204', 205', 206' and 210'. The switch 201' is interposed between the pairs of relays 213—214 and the corresponding stationary contact 201 in the thermostatic element. The switch 204' is interposed between the pair of relays 215—216 and the corresponding stationary contact 204 in the thermostatic element. The switch 205' is interposed between the pair of relays 217—218 and the stationary contact 205 of the thermostatic element. The switch 206' is interposed between the pair of relays 219—220 and the corresponding stationary contact 206 in the thermostatic element. And the switch 210' is interposed between the pair of relays 221—222 and the corresponding contact 210 of the thermostatic element.

Each of the switches 201', 204', 205', 206' and 210' comprises a rocking shaft carrying a contact making element and a roller. The contact making element is adapted to make or to break contact of two pairs of contacts, as by means of a mercury globule, each switch being of the type described in connection with the switch 153 shown in Figure 6. A movable control element designated by the numeral 200 cooperates with these mercury switches 201', 204', 205', etc. This movable control element 200 corresponds to the movable control element 147 shown in Figure 6. It may consist of a movable plate provided with a number of notches or recesses placed in laterally staggered and longitudinally spaced relation relative to each other, each notch or recess provided for a corresponding mercury switch. The various mercury switches shown cooperate with the movable element 200 in the manner of a selector. That is to say, the movable element is actuated upon actuation of the motor mechanism in response to the operation of one relay of the pairs of relays to move in one or the other direction, depending upon the rise or fall of temperature, and to thereby select that mercury switch which is involved in the operation. The roller on the rocking shaft of the corresponding mercury switch will drop into the corresponding notch or recess and will thereby interrupt the circuit and terminate the actuation of the controlling switch member.

The mercury switch designated by the reference numeral 205' is shown in a position illustrating the condition of the circuit controlled by the mercury switch when the same has dropped into the corresponding recess or notch in the movable control element 200. It will be seen that the contacts connected to the corresponding stationary contact 205 in the thermostatic element are open while certain contacts of the adjacent mercury switches are closed and keep certain circuits in preparation for subsequent operation. The position in which the equipment is shown in Figures 9 and 10 illustrates the condition at the termination of a certain cycle of operation of the control equipment. It is assumed that a circuit had been closed by the roller contact on the movable arm 211 of the thermostatic element over the stationary contact 205 in response to certain temperature variations. This closing of the circuit over the contact 205 transmitted an impulse to one of the relays 217 or 218 and the corresponding relay in turn caused the operation of one of the relays 224 or 225, depending on the direction of the temperature variations. The corresponding latter relay closed the circuit for the actuation of the motor 226. The relay (217 or 218) involved in the operation, acting also as a lockout relay made the thermostat and also all the other relays (213–222) ineffective for the time of the operating cycle. The selector element 200 moved then together with the hydraulic control equipment as discussed in connection with Figures 6 and 7 seeking the switch 205' which caused the operation of the control equipment. The notches or recesses in the movable control element 200 are arranged it will be noted, in accordance with a predetermined curve. The mercury switch 205' was actuated into the position in which it is shown in the drawing (Figure 10), that is to say, the mercury switch 205' dropped with its roller into the corresponding recess in the control element 200 at a predetermined point. Upon dropping into the recess and assuming the position as shown in Figure 10, the mercury switch 205' interrupted the circuit for the corresponding relay 217 or 218, which was involved in the operation, and this latter relay in turn disconnected the corresponding relay 224 or 225, respectively, to terminate the operation of the motor mechanism 226, and therefore the operation of the hydraulic control equipment at this predetermined point designated by the notch or recess in the movable element 200. In deenergizing the corresponding relay 217 or 218 restored the operative condition of the thermostat and of the other control relays.

The control relays 213 to 222, inclusive, and the relays 224 and 225 operate on low voltage. The motor 226, however, operates on high voltage. The term—low voltage—refers to a voltage somewhere around 18 volts. The term—high voltage—as used in this specification, refers to a commercial voltage which may be 110 volts or 220 volts or higher, as is usually obtainable from a commercial lighting circuit.

The feeding wires for connecting the equipment to the commercial current source are designated in Figure 10 by the reference numerals 227 and 228. The switch 229 is provided for connecting the equipment to the commercial current source by way of the wires 196 and 197. Branch connections 230 and 231 lead from the wires 196 and 197 over fuses 232 and 233 to contact mechanisms operated by the relays 224 and 225, respectively, and thence to the motor 226. A circuit for operating the motor 226 directly from the commercial current source will be traced presently. However, it may be remarked at this point that this motor 226 operates directly on the high voltage source.

The wires 196 and 197 as is shown, are connected to a transformer 234 by way of the fuses 235 and 236. This transformer 234 may be provided for yielding low voltage from 10 to 20 volts as desired and as required for operating the relay equipment. The output may be regulated by means of the taps branching from the secondary winding and by means of the switch 237 for establishing connection with the various taps. The transformer feeds into a bridge rectifier such as indicated schematically in the drawings by the reference numeral 238. One leg of the rectifier 238 is connected to the terminal 239 and the other leg is connected to the terminal 240. The condenser 241 may be bridged across the terminals as shown. The retardation coil 242 may be interposed in the circuit and substituted for the direct connection 243 in case the relays chatter. If this is not the case, the retardation coil 242 can be dispensed with. The transformer is adjusted by means of the arm 237 which may connect to any of the taps on the secondary side of the transformer, to give approximately 18 volts across the terminals 239 and 240 to which are connected the feeding wires for the control relay mechanism.

The above account of the transformer and cooperating circuit connections is deemed sufficient for conveying a clear understanding. The function of each individual part is known and need not be discussed at great length at this place. It will be sufficient to bear in mind that low voltage of approximately 18 volts is delivered across the terminals 239—240 shown in the left-hand corner of the drawings (Figure 9).

The positive bus bar is shown prominently and designated by the numeral 195. A branch connection connects the terminal 239 with the ground wire 191 over the resistance 223' which may be about 150 ohms. The negative bus bar is likewise shown in prominent lines designated by the numeral 192. The control buses 193 and 194 are provided for the control relays 224 and 225, respectively, and for the control thereof by means of the relays 213 and 222, respectively.

It will be seen that the normally open contact 254 of the relay 213 is connected to the control bus 193 by means of the wire 244; the normally open contact 255 of the relay 214 is connected to the control bus 194 by means of the wire 245. The normally open contact 256 of the relay 215 is connected to the bus 193 by way of the wire 246; the normally open contact 257 of the relay 216 is connected by means of the wire 247 to the bus 194. This scheme is followed throughout, that is to say, the normally open contacts 258, 260 and 262 of the relays 217, 219 and 221, respectively, are connected to the control bus 193 by way of the wires 248, 250 and 252, respectively, while the normally open contacts 259, 261 and 263 of the relays 218, 220 and 222 are connected to the control bus 194 by the wires 249, 251 and 253, respectively. Stated in other words, one relay in each pair of relays is adapted to close a circuit to the control bus 193 and the other of each pair of control relays is adapted to provide a circuit for the control bus 194. The relays 213, 215, 217, 219 and 221 are adapted to provide circuits for the control bus 193, and the relays 214, 216, 218, 220 and 222 are adapted to provide circuits for the control bus 194.

The relay 224 is connected to the control bus 193 by means of the wire 264, and the relay 225 is connected to the control bus 194 by way of the wire 265. The other terminal of the winding of each of the relays 225 and 224 is connected to the common wire 266 which maintains connection with the positive bus bar 195. In other words, the control relays 224 and 225 are connected to the positive bus bar and may be energized selectively over the control bus bars 193 and 194, respectively. These control bus bars 193 and 194 may be controlled by the relays 213 to 222, inclusive. Specifically, the relays 213—215—217—219—221 control the operation of the relay 224, and the relays 214—218—220—222 control the operation of the relay 225. In addition to the above, the relays 215 to 222 inclusive, are provided with electrical interlocking connections so that the operation of any one relay will prevent the energizing of the coil of any other relay, and are further provided with holding circuits whereby each relay keeps its coil energized independently of the thermostatic element 211 during the operation of the regulating motor 226. If due to vibration or any other cause, the roller contact should leave the last excited contact and establish connection with any other contact there will be no effect until the mechanism has completed the cycle.

The relay 224 controls the operation of the motor 226 in a direction to regulate the heat supply mechanism to decrease the heat supply in response to falling temperatures; and the relay 225 controls the motor 226 in the other direction so that the heat supply regulating mechanism may alter the heat output in accordance with rising temperature variations.

Now, before presenting the operation of the control equipment by tracing certain circuits, I wish to call attention to a number of alternate connections which I have provided. It will be seen that the thermostatic control element is shown to have eleven stationary contacts, namely, the control 201 to 203, 203', 204 to 210, inclusive. Accordingly, if it is assumed that all the stationary contacts are used, there should be eleven pairs of relays such as the pairs 213—214, 215—216, etc. I have shown only five pairs of relays, namely, 213—214, 215—216, 217—218, 219—220 and 221—222. These relays cooperate with the stationary contacts 201, 204, 205, 206 and 210. Certain stationary contacts in the thermostatic governing element are shown blank.

I have shown a limited number of control relays in order to keep the drawings as simple as possible. As to the meaning of alternate connections which I have provided, there may be any desired and practicable number of pairs of relays disposed between the pairs of relays 213—214 and 215—216. Likewise, there may be a desirable and practicable number of pairs of relays disposed between the pairs of relays 219—220 and 221—222. Now, if it is assumed that the pair of relays 215—216 in Figure 9 precedes an intermediate pair of relays (from right to left in the drawings) the wiring connection designated by the reference numeral 267 will be used for connecting the relay 215 to the corresponding relay of the adjacent intermediate pair of relays. The connection 268, however, will be used if the pair of relays 215—216 is located adjacent to end relays. If the contact 203' in the thermostatic element is connected to an intermediate relay (and the successive contact preceding the end contact) the connection 269 (Figure 9) will be employed. For an end relay, however, the connection 270 will be employed, which is shown to tie the contact 201 of the thermostatic element to the contact of the mercury switch 201'. The connection 271 shown to connect a contact of the mercury switch 201' to the control wire 186 is likewise employed for all relays between end relays. The connection shown at the lower side of the pairs of relays 213—214 and designated by the reference numerals 272, 273, 274 and 275 are likewise employed for all relays between end relays. The conditions on the right hand side of Figure 10 are similar. The connections designated by the reference numerals 276 and 277 are employed for end relays; and the connections designated by reference numerals 278, 279, 279', 280, 281, 282, 283, 284 and 285 are employed for all relays between end relays.

The operation of the control system is as follows:

It is assumed that the temperature has reached a certain degree at which the contact roller attached to the arm 211 of the thermostatic element has established connection with the stationary contact 205. It is further assumed that the temperature has a rising tendency. The contact roller on the arm 211 of the thermostatic element therefore establishes connection with the stationary contact 205 after leaving the contact 206. At this moment of the operation, the mercury switch 205 is in a position corresponding to the position of the mercury switch 206'. The contacts 286 and 287 in the mercury switch 205' are closed by the corresponding contact making element which is shown to be a bar in Figure 10 which, however, in reality is a mercury globule as was discussed previously. An impulse is therefore delivered to the relay 218 for energizing this relay. Upon energizing, relay 218 closes a circuit for the energization of the relay 225 by actuating its contact 288 and thereby establishing connection with the normally open contact 259, closing the circuit for the relay 225 over the wires 249, 265, winding the relay 225, common wire 266 to the positive bus bar 195. The relay 225 operates and closes a circuit for the motor 226 to actuate this motor in the proper direction in accordance with the rising tendency of the temperature. The motor upon operating actuates the heat supply regulating mechanism as was previously discussed, thereby adjusting the heat output in accordance with the degree of temperature variation which is represented by the stationary contact 205 in the thermostatic element. The motor 226 also operates the movable element 200 in the proper direction, that is, in the direction of the arrow 229 shown above the relay 218 to the right of the mercury switch 205'. The recess in the movable control element 200 provided for the mercury switch 205' moves towards the same, and when the mercury switch 205' is reached by the recess in the movable element 200, the mercury switch 205' drops into the position in which it is shown in the drawings. The circuit over the contacts 286 and 287 is therefore interrupted, the relay 218 deenergizes, deenergizing in turn the relay 225 by opening the contacts 259, and the relay 225, upon deenergizing, opens the circuit for the motor 226, terminating the operation of the control equipment at a point when the heat supply regulation is accomplished to compensate for the temperature variation corresponding to the predetermined step of temperature which is represented by the stationary contact 205 in the thermostatic governing element. The equipment is now in the position shown.

It will be noted that the selector switch 205' is now in the open position so that the arm 211 of the thermostatic element when maintaining connection with the contact 205 produces no response in the control apparatus. It will also be noted that the selector switches 206' and 210' are now positioned to establish connection between the thermostatic control element and the relays 220 and 222 preparatory to responding to a demand for an adjustment for a lower outside temperature. Similarly the selector switches 201' and 204' are positioned to establish connections with the relays 213 and 215 preparatory to bringing about an adjustment for a higher outside temperature.

If, for example, the arm 211 next makes contact with the stationary member 204, the relay 215 will be energized to bring about an adjustment of the regulating apparatus for a higher outside temperature, which adjustment will move the member 200 to the left until the selector switch 204' is engaged and moved to an open position. This movement of the member 200 will move the selector switch 205' to the right to bridge the contacts 286 and 287 to establish connection to the relay 218 in preparation for a future adjustment of the apparatus to return it to the position shown in the drawings.

As previously mentioned, interlocking and holding circuits are provided in the relays to prevent any interruption of the normal response of the regulating apparatus to the indications of the thermostatic control element 211. It will be noted that the arm 211 is connected through the conductor 185 and the resistors 223 and 223', to the positive bus 196. In making contact with one of the stationary members, as for example the member 204, the thermostatic control element delivers positive potential through the switch 204' to one side of the coil of the relay 215. The opposite terminal of the coil of the relay 215 is connected through the normally closed contact 293 to the interlocking bus 190. Negative potential is supplied to the interlocking bus 190 through a group of series connected, normally closed contacts, namely, contact 308 of relay 213, contact 309 of relay 214, contact 307 of relay 215, etc., one contact of this group being found on each relay. This group of contacts is connected at the left hand end of the diagram (Figure 9) to the negative bus 192 by means of the conductor 310, and at the right hand end of the diagram (Figure 10) to the interlocking bus 190 by means of the conductor 295. It is thus seen that the operation of any one relay opens the circuit and removes the negative potential from the interlocking bus 190 to prevent the operation of any other relay. Assuming that it is the relay 215 which operates, it is evident that some means must be provided for maintaining a connection of the coil of this relay to the negative bus, for as above stated, the interlocking bus 190 becomes dead upon operation of any relay. Such a connection is provided by means of a normally open contact 311 which establishes a direct connection through the conductor 312 to the negative bus 192. Immediately following the closing of the contact 311 the contact 293 opens to isolate the interlocking bus 190.

A normally open contact 313 is also provided on the relay 215 to provide positive potential from the intermediate bus 191, through the selector switch 204 to the coil of the relay, independent of the connection provided through the contact 204 of the thermostatic control element. This insures the continued operation of the device until the cycle is completed, should the circuit be open at the thermostatic element for any reason after the relay 215 has been actuated but before the adjustment of the regulating apparatus has been completed. Similar interlocking connections are provided on each of the other relays.

It is thus seen that when the thermostatic control element acts to operate one of the several control relays, that relay immediately usurps the control and retains the same until the adjustment of the regulating apparatus has been completed. Upon the completion of the adjustment, the selector switch associated with that particular relay opens the relay's circuit to terminate the adjusting operation and to restore the control of the system to the thermostatic element 211.

In conclusion, I wish to enumerate the salient features of my invention in order to recall to mind those parts of the specification which refer to them.

I have disclosed a novel multi-step-thermostat responsive to temperature variations and adapted to transmit impulses anticipatory of predetermined fractional steps of such temperature variations.

I have also disclosed a control equipment for a heat supply system which responds to the anticipatory impulses from the thermostat in steps of predetermined temperature variations for regulating the heat supply to compensate for these variations. While a cycle is in progress, the thermostat and control relays not involved in the cycle, are locked out and prevented from operating.

I have further disclosed relay means automatically operable in cooperation with selector mechanism for terminating the action of the control equipment when the heat supply is properly regulated to compensate for a predetermined step of temperature variation, thereby also restoring the operating conditions of the thermostat and certain relays which were locked out during the progress of the cycle.

Various modifications may be carried out in the control system which I have disclosed. It will therefore be understood that I do not desire to be limited strictly to the form of carrying out the invention as I have shown and described the same. It will also be understood that the multi-step-thermostat and the basic principles on which it operates may be applied to controlling differently constructed apparatus and also apparatus for different purposes. Likewise, structural changes may be made in the multi-step-thermostat which I have shown within the limitations of my teachings. The structure of the multi-step-thermostat may be changed, and the selector as well as other control apparatus may be constructed differently as I have intimated at various places in the general as well as in the detailed discussion. The system may also be employed in widely differing fields within the broad scope of the inventive idea. I therefore do not intend to be limited in realizing and in applying the invention, either to the precise embodiment shown, or to any specific purpose except as I have defined in the following claims.

I claim as my invention:—

1. In a heating system, an element selectively responsive to outside temperature variations in predetermined steps, electro-responsive low voltage control means selectively operable by said element anticipatory of said steps of outside temperature variations, motor means selectively operable by said low voltage control means, hydraulic control means selectively operable by said motor means for regulating the heat supply anticipatory of and in substantially linear relation to said predetermined steps of outside temperature variations, and selectively operable governing means actuated by said motor means for terminating the operations of said control means and of said motor means upon determining the heat supply regulation relative to said anticipated temperature variation.

2. In a heat supply control system, a multi-step thermostatic element responsive to outside temperature variations, said element having a plurality of stationary contacts, a selector switch connected to and cooperating with each of said contacts, a pair of relays cooperating with each of said selector switches, means in said element responsive to temperature variations and effective prior to a variation in temperature corresponding to a predetermined step in temperature variation for establishing connection with one of said stationary contacts to transmit a current impulse to the selector switch connected to said contact, means in said selector switch for transmitting said impulse to energize one of said pairs of relays depending on the direction of said temperature variation, a pair of relays common to said first relays, contact means actuated by said energized relay for energizing one of said common relays depending on the direction of temperature variation, a reversible motor, contact means actuated by said energized common relay for operating said motor in accordance with the direction of temperature variation, means controlled by said motor for adjusting the heat supply to compensate for said temperature variation, and means operated by said motor for thereafter actuating the corresponding selector switch to break the circuit closed by the operation of said governing element.

3. In a heat supply control system, a thermostatic governing element, relay means selectively controlled thereby, switching means controlled by said relay means, mechanisms responsive to said switching means for regulating the heat supply relative to the operation of said governing element, and means in said relay means for locking out said governing element during the operation of said mechanisms.

4. In a heat supply control system, a governing element responsive to temperature variations, a plurality of relays selectively operable by said governing element anticipatory of predetermined steps of temperature variations, regulating means controlled by said relays when actuated for compensating for an anticipated step of temperature variation, and means in each of said relays for locking out said governing element and the other of said relays while said regulating means is operating.

5. In a control system, a temperature responsive device having a movable contact and a plurality of cooperating stationary contacts, relay means cooperating with each of said stationary contacts, an energizing circuit for each of said relay means including contacts of the other relay means, contact means operable by each of said relay means upon energization thereof for interrupting the energizing circuit of said other relay means, and switching means controlled by said relay means.

6. In a control system, a temperature responsive device having a movable contact and a plurality of cooperating stationary contacts, relay means cooperating with each of said stationary contacts, an energizing circuit for each of said relay means including contacts of the other relay means, contact means operable by each of said relay means upon energization thereof for interrupting the energizing circuit of said other relay means, switching means controlled by said energized relay means, and means controlled by said switching means for restoring said energizing circuit for said other relay means and for terminating the operation of said switching means at predetermined positions thereof.

7. In a building heating system, a steam supply main, a radiator connected thereto, an interposed orifice between the two for controlling the rate of steam flow into the radiator, a movable device, means for varying the steam flow to the supply main in accordance with the position of the movable device, means for moving the device to predetermined positions responsive to the establishment of predetermined outside temperatures when the outside temperature is rising and to the same positions responsive to the establishment of different and higher outside temperatures when the outside temperature is falling, a return main from the radiator, a second movable device, means for establishing a vacuum in the return main and maintaining it at a value determined by the position of the second movable device, and means for moving the second movable device in accordance with the movement of the first named device.

8. In a building heating system, the combination with a steam heated radiator, pressure control means for controlling the heat input to the radiator, a motor for the pressure control means, switching means governing the operation of the motor, thermally controlled means operated at a predetermined temperature when the temperature is rising and at a different and higher temperature when the temperature is falling, pressure responsive means influenced by the steam pressure of the system, and means subject to said thermally controlled means for influencing the pressure responsive means, said switching means being controlled by the pressure responsive means.

9. In combination with a steam supply main, pressure control means therefor, a motor for the pressure control means, pilot means governing the operation of said motor, thermostatic means responsive to temperature at a predetermined point, pressure responsive means influenced by pressure in the supply main, and means actuated by said thermostatic means at one temperature when the outside temperature is rising and at another and higher temperature when the outside temperature is falling for influencing said pressure responsive means, said pilot means being controlled by said pressure responsive means.

10. In combination with a steam supply main, pressure control means therefor, a motor for the pressure control means, a pilot switch governing the operation of said motor, thermostatic means responsive to temperature at a predetermined point, pressure responsive means influenced by pressure in the supply main, a plurality of relays selectively actuated by the thermostatic means, interlocking means preventing the simultaneous actuation of more than one relay, a multi-position device, means for moving the device to a position determined by the actuated relay, and means controlled by the device for influencing said pressure responsive means, said pilot switch being controlled by said pressure responsive means.

JOHN A. SERRELL.